United States Patent [19]

Jackson et al.

[11] Patent Number: 6,067,821

[45] Date of Patent: *May 30, 2000

[54] PROCESS FOR MAKING MINERAL WOOL FIBERS FROM LUMPS OF UNCALCINED RAW BAUXITE

[75] Inventors: James Roger Jackson, Lancashire, United Kingdom; Charles F. Rapp, Newark, Ohio; George D. Baybutt, Lancashire; Harry Pennington, Cheshire, both of United Kingdom

[73] Assignee: Owens Corning Fiberglas Technology, Inc., Summit, Ill.

[ * ] Notice: This patent issued on a continued prosecution application filed under 37 CFR 1.53(d), and is subject to the twenty year patent term provisions of 35 U.S.C. 154(a)(2).

[21] Appl. No.: 08/723,453

[22] Filed: Oct. 7, 1996

[51] Int. Cl.$^7$ ....................................................... C03B 5/08
[52] U.S. Cl. ...................................... 65/482; 65/19; 65/27
[58] Field of Search ................................. 65/482, 19, 469, 65/27

[56] References Cited

U.S. PATENT DOCUMENTS

| | | |
|---|---|---|
| 2,428,810 | 10/1947 | Powell . |
| 2,520,168 | 8/1950 | Powell . |
| 2,520,169 | 8/1950 | Powell . |
| 4,560,606 | 12/1985 | Rapp et al. . |
| 4,818,221 | 4/1989 | Besne ........................................ 65/135 |
| 5,312,806 | 5/1994 | Mogensen . |

FOREIGN PATENT DOCUMENTS

| | | |
|---|---|---|
| WO 94/14717 | 7/1994 | WIPO . |
| WO 96/14274 | 5/1996 | WIPO . |
| WO 96/14454 | 5/1996 | WIPO . |

OTHER PUBLICATIONS

Merriam Webster's "Webster's Ninth New Collegiate Dictionary" 1990, p. 709.

"Effects of Chemical Composition of Man–made Vitreous Fibers on the Rate of Dissolution in Vitro at Different pHs" by V.R. Christensen, S. Lund Jensen, M. Gulderg, and O. Kamstrup of Rockwool International A/S, Hedehusene, Denmark, Environ Heeealth Perspect 102 (Suppl 5): 83–86 (1994).

"Investigation on the durability of the stone wool HT in rat lungs" by B. Bellmann and H. Muhle Nov. 1994.

"Nomenclature of Man–Made Vitreous Fibers" by the Nonmenclature Committee of TIMA Inc. Apr. 15, 1991.

*Primary Examiner*—John Hoffmann
*Attorney, Agent, or Firm*—Inger H. Eckert; Stephen W. Barns

[57] ABSTRACT

A process for making mineral wool fibers having high-temperature stability consisting essentially of: (a) preparing a mixture containing basalt and a quantity of uncalcined raw bauxite sufficient to provide the resulting fibers with an alumina content of at least 18 weight percent, preferably of from 19 to 23 weight percent; (b) heating the mixture to a temperature sufficient to form a substantially homogeneous melt, e.g., in a cupola furnace using coke in a quantity of from about 11 to 25 percent by weight of the mixture; and (c) forming the melt into fibers. The mixture may optionally contain a flux, e.g., limestone and/or dolomite, such as a flux providing a weight ratio of limestone plus dolomite to basalt of less than about 0.6, e.g., 0.1–0.4. The mixture may also contain slag in a weight ratio of slag:basalt of less than about 1.0, more preferably about 0.6. At least about 90% of the uncalcined raw bauxite is of a particle size capable of passing through a 150-mm mesh screen but incapable of passing through a 25-mm mesh screen, more preferably capable of passing through a 125-mm mesh screen but not a 50-mm mesh screen. Preferably, the bauxite has a bound-water content of 10–33 weight percent. The weight ratio of alumina to silica in the fibers is preferably greater than 0.35.

18 Claims, 1 Drawing Sheet

PROCESS FOR MAKING MINERAL WOOL FIBERS FROM LUMPS OF UNCALCINED RAW BAUXITE

TECHNICAL FIELD AND INDUSTRIAL APPLICABILITY OF THE INVENTION

The present invention relates to the manufacture of mineral wool fibers. The invention is also directed to mineral wool fibers having enhanced properties. Mineral wool fibers made in accordance with the invention have many uses, such as those known for mineral wool fibers in general, e.g., as thermal and acoustical insulation media, and as fire-barrier materials.

BACKGROUND OF THE INVENTION

As used herein, "mineral wool" includes all man-made vitreous fibers made from rock, stone and slag which are variously referred to as rock wool and slag wool. Mineral wool fibers are typically formed by melting mineral-laden rocks and materials, such as basaltic rock, limestone, dolomite and metallurgical slags, and attenuating the molten mass into fibers by spinning or other techniques. While the types and amounts of the various components of the melt depend largely on the requisite melt-processing characteristics and the properties desired for the resulting fibers, basalt is usually the primary raw material. Commonly, a flux such as dolomite, limestone or slag is added to reduce the melting temperature of the mixture and improve its processability into fibers.

The compositions of mineral wool fibers vary depending on the intended end-use application. Exemplary rock and slag wool compositions, with amounts given in weight percentages, are as follows:

| Component | Rock Wool made from basalt melted in a furnace | Rock Wool made from basalt and other in a cupola | Slag Wool made from slag melted in a cupola |
|---|---|---|---|
| $SiO_2$ | 45–48% | 41–53% | 38–52% |
| CaO | 10–12% | 10–25% | 20–43% |
| MgO | 8–10% | 6–16% | 4–14% |
| $Al_2O_3$ | 12–13.5% | 6–14% | 5–15% |
| $K_2O$ | 0.8–2% | 0.5–2% | 0.3–2% |
| $Na_2O$ | 2.5–3.3% | 1.1–3.5% | 0–1% |
| $TiO_2$ | 2.5–3% | 0.9–3.5% | 0.3–1% |
| FeO* | 11–12 | 3–8 | 0–2 |
| S | 0–0.2 | 0–0.2 | 0–2 |
| $P_2O_5$ |  |  | 0–0.5 |

*: In rock and slag wool produced from materials in a cupola with coke as fuel, substantially all iron oxide is reduced to FeO. During the spinning process, a surface layer may form in which the iron is oxidized to $Fe_2O_3$. Typically 8–15% of the iron is oxidized to $Fe_2O_3$. In an electric furnace melting basalt, up to 50% of the iron is in the form of $Fe_2O_3$ and is more evenly distributed throughout the entire fiber volume.

In view of the possibility that such fibers, or fragments thereof, can be inhaled, a desire exists for the development of mineral fiber compositions that exhibit a high biosolubility, while preferably maintaining acceptable processability and good insulating and fire-retarding characteristics. The solubility of mineral wool fibers in human lung fluid is affected by the chemical composition of the fibers. In particular, the alumina content of the fiber has been found to have a significant impact on the solubility of the fiber. Although mineral wool fibers typically contain from 4 to 16% alumina (unless indicated otherwise, all percentages and ratios given herein are by weight), enhanced solubility has been reported to be exhibited by fibers containing amounts of alumina outside this range. For example, low alumina-content fibers having high biosolubility are disclosed in International Patent Publication No. WO 94/14717, and high alumina-content fibers having high biosolubility are discussed in V. R. Christensen et al., "Effect of Chemical Composition of Man-made Vitreous Fibers on the Rate of Dissolution In Vitro at Different pHs," *Environmental Health Perspectives*, 102 (Suppl.5), 83–86 (1994).

Mineral wool fibers containing at least 18% alumina also can have improved high-temperature stability. For example, mineral wool fibers containing 18–25% alumina and having high softening temperatures are disclosed in U.S. Pat. No. 4,560,606, and mineral wool fibers containing 31–38% alumina that exhibit improved resistance to high temperatures are disclosed in U.S. Pat. No. 5,312,806. High alumina-content mineral wool fibers are particularly desirable for high-temperature applications.

While low alumina-content compositions can be obtained by the selective use of suitable rock as the main raw material, compositions with low amounts of alumina are difficult to fiberize effectively due to rapid crystallization and viscosity control problems. In contrast, compositions with greater than 18% alumina require the addition of minerals or chemical agents to augment the alumina content of the standard raw materials. This is particularly true if the ratio of alumina to silica in the composition exceeds about 0.35. Although alumina powder, china clay or calcined bauxite chippings can be used for this purpose, these materials all have the disadvantages of being relatively expensive and requiring consolidation into blocks or briquettes of suitable size before they can be used in a cupola furnace, which adds further to the cost. Accordingly, a need exists for an economical means to introduce sufficient alumina into the melt to obtain good processability and increased high-temperature stability in the resulting fibers. This need has now been met by the our discovery that uncalcined lumps of raw bauxite may be added to mineral wool compositions melted in a cupola furnace to provide mineral wool fibers exhibiting increased resistance to softening at high temperatures.

SUMMARY OF THE INVENTION

The present invention provides a process for making mineral wool fibers exhibiting high-temperature stability by incorporating uncalcined lumps of raw bauxite into the melt from which the fibers are formed. Preferably, the mineral wool fibers made according to the invention also have increased biosolubility.

We have discovered that lumps of uncalcined raw bauxite can be used in a cupola furnace without the occurrence of explosive decrepitation or insolubility of the alumina. Prior to this discovery, it was generally thought that the high bound-water content of uncalcined bauxite would cause explosive decrepitation of such bauxite lumps, resulting in the generation of small bauxite particles that could plug the gas passages vital to the efficient operation of a cupola furnace. Further, it was generally believed that lumps of bauxite may sinter at the high temperatures of a cupola furnace, resulting in large particles of alumina that would not be completely solubilized by the melt. Surprisingly, in the process of the present invention, neither problem has been observed.

According to the present invention, uncalcined raw bauxite is added to the basalt with optional fluxes and additives from which mineral wool fibers are typically attenuated in an amount sufficient to raise the alumina content of the resulting fibers to at least 18% by weight. At such alumina levels, the resulting mineral wool fibers exhibit stability at high temperatures. After mixing the uncalcined raw bauxite, basalt and optional fluxes and additives, the mixture is heated to a temperature sufficient to form a substantially homogeneous melt, which is then processed into fibers via conventional techniques.

BREIF DESCRIPTION OF THE DRAWING

FIG. 1 is a graphical representation of the method.

DETAILED DESCRIPTION AND PREFERRED EMBODIMENTS OF THE INVENTION

Figure 1:
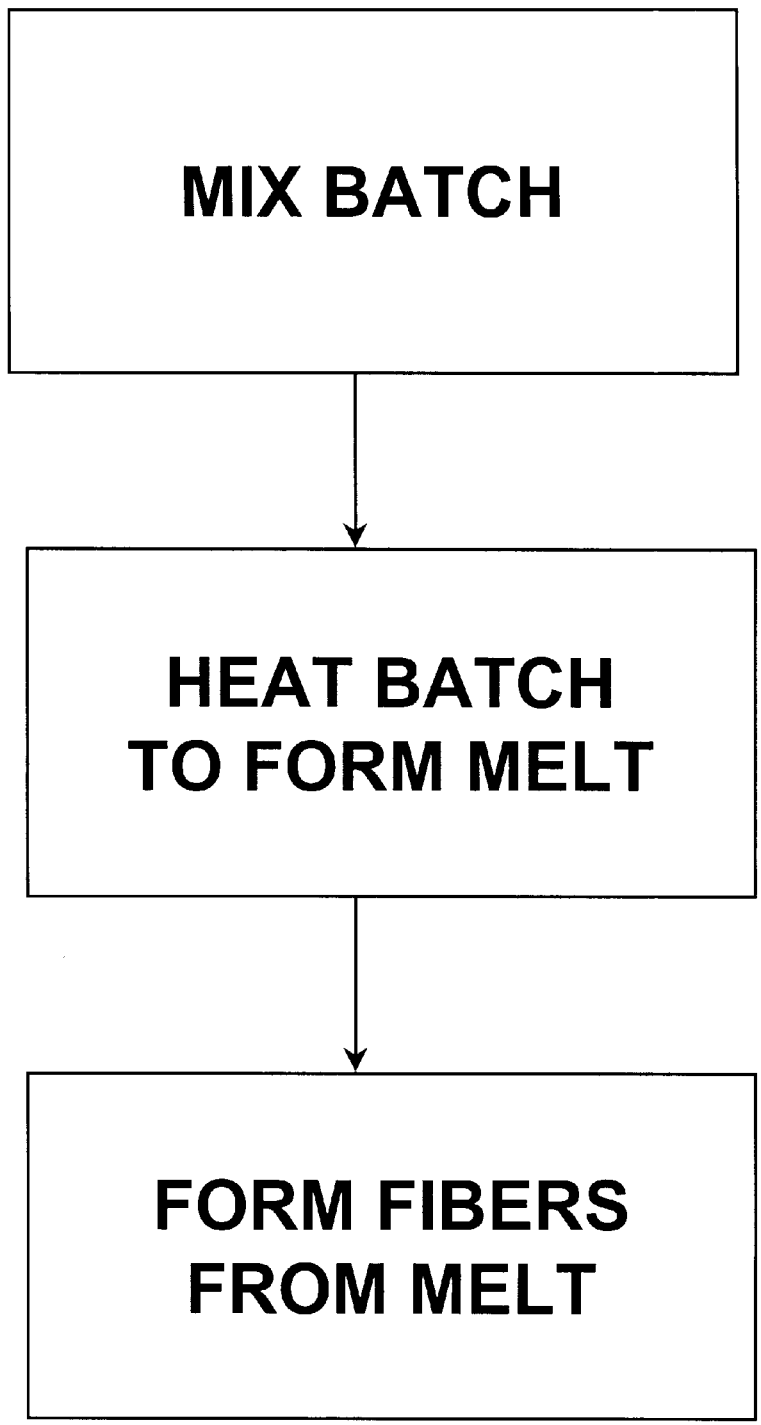

The present process for making improved mineral wool fibers comprises: (1) combining (a) basalt, (b) sufficient uncalcined raw bauxite to provide the resulting fibers with a final alumina content of 18% or greater by weight, and optionally (c) one or more fluxes selected from limestone, dolomite and slag; (2) heating the resulting mixture to a temperature sufficient to form a substantially homogeneous melt; and (3) attenuating the molten mixture into fibers. According to this process, mineral wool fibers are formed that contain at least 18% alumina and exhibit improved high-temperature stability. Such fibers may also exhibit enhanced solubility in human lung fluid.

The mixture may be melted in any high-temperature furnace capable of generating sufficient heat to reduce the mixture to a melt with a viscosity suitable for processing the melt into fibers. Although gas and electric furnaces may be used, coke-fed cupola furnaces are particularly useful and are preferred. In such furnaces, coke is fed into the furnace with the raw material charge, either as a mixture or in alternating layers. Inside the furnace, heat from the combustion of the coke melts the raw material charge.

The basalt, bauxite and optional fluxes may be individually added directly to the furnace, or they may be premixed. Premixing of the components to form a substantially homogeneous mixture prior to their introduction into the furnace enhances the melting and the homogeneity of the resulting melt, and is generally preferred. Mixing may be achieved by any standard mixing equipment suitable for this purpose.

It is preferred that the particle size of the various components be approximately the same to facilitate uniform mixing. Moreover, if a cupola furnace is used to melt the mixture, the particles of all raw materials should be sufficiently large to ensure good gas flow throughout the furnace to facilitate heat transfer as well as the proper functioning of any pollution-abatement equipment. Powders of finely divided materials generally should not be added to a cupola furnace as they tend to block the gas passages by which heat transfer to the batch occurs, and any fine material may well be carried over into any pollution-control equipment by the blast air, resulting in excessive pressure build-up and consequent bypassing of the pollution-control equipment. On the other hand, if the particles are too large, excessive heat losses through the bed can occur, resulting in inefficient operation and the potential for damage to any pollution-control equipment due to the high temperature of the effluent gasses. Accordingly, when a cupola furnace is used to melt the mixture, it is preferred that the particle size of the raw materials be such that preferably at least 90%, more preferably at least 95%, of the particles are capable of passing through a sizing screen having mesh of about 150 mm but are incapable of passing through a sizing screen having a mesh of about 25 mm. More preferably, the particle size of the raw materials is such that preferably at least 90%, more preferably at least 95%, of the particles will pass through a sizing screen having a mesh size of about 125 mm but not through a sizing screen having a mesh of about 50 mm.

The basalt and optional fluxes and additives used in the process of the invention may be any of those known or suitable for the manufacture of mineral wool fibers. A preferred basalt material has the following specification (in the specifications given below, the components are reported as oxides in accordance with standard practice, the typical amounts and preferred ranges represent the approximate average values in parts by weight from sample analyses, and loss on ignition (LOI, which is the reduction in weight of the fibers after heating by burning or pyrolyzing) is typically measured by heating dried fibers to about 955 degrees C):

| BASALT | | |
|---|---|---|
| Component | Amount | Range |
| $Al_2O_3$ | 14.0 | 13.0–17.0 |
| $Fe_2O_3$ | 12.0 | 8.0–15.0 |
| $SiO_2$ | 50.0 | 44.0–55.0 |
| $TiO_2$ | 1.9 | 0.3–3.0 |
| MgO | 8.1 | 4.0–10.0 |
| CaO | 8.6 | 6.0–14.0 |
| $Na_2O$ | 2.8 | 1.0–4.0 |
| $K_2O$ | 0.6 | 0.1–2.0 |
| Property | Value | Range |
| Loss On Ignition | 1.7 | less than 5.0 |

Fluxes such as limestone and dolomite can exist naturally as very pure calcite ($CaCO_3$) and dolomite ($CaCO_3$—$MgCO_3$), respectively, or as a mixture of these two materials. In addition, these natural materials may contain various amounts of clay, silica and other impurities. A wide variety of limestone and dolomite compositions can be used as fluxes in the present invention. However, since high amounts of MgO in the final composition can contribute to the high-temperature stability of the resulting fibers, dolomite or high-MgO limestone compositions are more preferred. A preferred dolomite for use as a flux has the following specification:

| DOLOMITE | | |
|---|---|---|
| Component | Amount | Range |
| $Al_2O_3$ | 0.2 | 0.1–0.5 |
| $Fe_2O_3$ | 0.3 | 0.1–0.5 |
| $SiO_2$ | 0.3 | 0.1–2.0 |
| MgO | 21.2 | 19.0–22.0 |
| CaO | 30.4 | 29.0–34.0 |
| Property | Value | Range |
| Loss On Ignition | 47.5 | 46.0–49.0 |

Additionally, part of the basalt, dolomite or limestone in the composition can be replaced with a metallurgical slag, provided that the final alumina content in the fibers is at least 18%. A broad variety of slag compositions are useful for this purpose. A preferred slag composition has the following specification:

| SLAG | | |
|---|---|---|
| Component | Amount | Range |
| Al$_2$O$_3$ | 14.2 | 8.0–17.0 |
| SiO$_2$ | 35.1 | 32.0–40.0 |
| MgO | 8.0 | 2.0–19.0 |
| CaO | 40.5 | 32.0–44.0 |
| Sulfur | 0.7 | less than 2.0 |

The basalt and other optional fluxes and additives may be used in any amounts suitable for the manufacture of mineral wool fibers, the selection of which is well within the purview of the artisan. Preferably, however, the weight ratio of limestone and dolomite to basalt in the raw material charge is from about 0 to about 0.6, and the weight ratio of slag to basalt is from about 0 to about 1.0. More preferably, the weight ratio of limestone and dolomite to basalt is from about 0.1 to about 0.4, and the ratio of slag to basalt is from about 0 to about 0.6.

Similarly, any suitable composition for the uncalcined raw bauxite may be used in the process of the invention. Bauxite is a natural material in the form of a mixture of one or more alumina hydroxide compounds with various amounts of silica, titania, iron oxide, and other impurities. A wide variety of bauxite compositions can be used in the present invention. However, since the presence of iron oxides in the resulting fibers enhances their fire retardance, bauxites containing significant concentrations of iron oxides are generally preferred. Suitable bauxites have been obtained from Greece and Ghana having the following dry compositional specifications:

| Greece BAUXITE No. 1 | |
|---|---|
| | Amount |
| Al$_2$O$_3$ | 60 |
| Fe$_2$O$_3$ | 22 |
| SiO$_2$ | 2.5 |
| TiO$_2$ | 2.8 |
| P$_2$O$_5$ | 0.05 |
| CaO | 1.5 |
| | Value |
| Loss on Ignition | 11.5 |

| Greece BAUXITE No. 2 | |
|---|---|
| | Amount |
| Al$_2$O$_3$ | 52 |
| Fe$_2$O$_3$ | 22 |
| SiO$_2$ | 10 |
| TiO$_2$ | 2.5 |
| P$_2$O$_5$ | 0.05 |
| CaO | 2.5 |
| | Value |
| Loss on Ignition | 12.0 |

| Ghana BAUXITE | | |
|---|---|---|
| | Amount | Range |
| Al$_2$O$_3$ | 53 | 51–55 |
| Fe$_2$O$_3$ | 15 | 12–18 |

| | | -continued |
|---|---|---|
| SiO$_2$ | 1.1 | 0.8–1.4 |
| TiO$_2$ | 1.8 | 1.6–2.0 |
| MgO | 0.02 | 0.01–0.03 |
| CaO | 0.01 | 0.01–0.02 |
| Organic Carbon | 0.06 | |
| Heavy Metals | 0.02 | |
| | Value | Range |
| Loss on Ignition | 28 | 27–29 |

Additionally, the Greek bauxites typically contain up to about 4% by weight free moisture, and the Ghana bauxite typically contains up to about 10% by weight free moisture. As indicated above, the LOI values are measured with fibers that do not include any free moisture.

Surprisingly, the amount of the chemically bound water in the bauxite does not affect its use in the process of the invention. Bauxite typically contains from approximately 10 to 33 percent bound water by weight. In the process of the present invention, bauxites having bound-water contents as high as 28%, such as the bauxite obtained from Ghana, have been used without the observance of explosive decrepitation.

The bauxite is added to the raw-material charge in an amount sufficient to ensure that the resulting fibers contain 18% by weight or greater alumina. Preferably, sufficient bauxite is added to provide the resulting fibers with an alumina content of greater than 18% up to about 25% by weight. More preferably, the amount of bauxite added to the formulation provides the resulting fibers with an alumina content of from about 19 to about 23 percent by weight. Further, it is preferred that the amount of bauxite is sufficient to ensure that the ratio of alumina to silica in the resulting fibers is greater than about 0.35.

After the mixture of basalt, bauxite and any optional fluxes or additives is reduced to a melt in the furnace, the melt is extruded, drawn or otherwise attenuated into fibers. This can be accomplished by any of the processes and equipment known in the fiber-making art, including rotary-spinning, extrusion, drawing, and fiber-blowing techniques. The fibers made by these processes can vary widely in length and diameter. For use as a thermal or acoustical insulation medium, the fibers preferably have diameters of from about 1 micron to about 10 microns. Fibers made for such purposes are preferably made by a multiwheel-centrifuge process, such as one described in U.S. Pat. Nos. 2,428,810, 2,520,168 or 2,520,169, or by a single-wheel centrifuge process, such as that described in U.S. Pat. No. 2,587,709, the disclosures of which are incorporated herein by reference.

Fibers made according to the inventive process exhibit improved high-temperature stability. Preferably, they also exhibit enhanced solubility in lung fluid.

The invention is further described by the following non-limiting examples, wherein all parts and percentages are by weight unless otherwise specified.

EXAMPLES

Fibers were made according to the process of the invention from mixtures of raw materials as follows:

|  | Example A | Example B | Example C | Comparative Example |
|---|---|---|---|---|
| Basalt | 56.30 | 57.24 | 55.35 | 68 |
| Dolomite | 20.75 | 17.58 | 16.53 | 16 |
| Slag | 12.12 | 11.00 | 10.00 | 16 |
| Bauxite(Ghana) | 10.83 | 14.18 | 18.12 |  |
| Dolomite/Basalt | 0.37 | 0.31 | 0.30 |  |
| Slag/Basalt | 0.22 | 0.19 | 0.18 |  |

The composition of each component was as set forth above.

Appropriate quantities of rock and slag pieces ranging from 1 inch to 4 inches in size (2.54 to 10.16 cm) were mixed and fed to a cupola furnace at the rate of approximately 4 to 5 tons per hour, along with approximately 16 parts coke per 100 parts stone. Fibers were produced form the resulting melt with a four-wheel spinner according to a method described in the patents referenced above. Melt rate and fiber production rate for Examples A–C were similar to those for the commercial mineral wool formulation provided as the Comparative Example.

Fibers from each melt were analyzed and found to have the following compositions, where the components are reported as oxides in accordance with standard practice, even though no such individual crystals exist in the fibers:

|  | Example A | Example B | Example C | Comparative Example |
|---|---|---|---|---|
| $SiO_2$ | 40.1 | 42.4 | 39.5 | 45.4 |
| $Al_2O_3$ | 18.9 | 19.4 | 21.9 | 13.7 |
| MgO | 11.6 | 10.2 | 11.0 | 11.3 |
| CaO | 19.1 | 16.7 | 16.8 | 19.6 |
| $Na_2O$ | 1.8 | 1.7 | 1.4 | 2.2 |
| $K_2O$ | 0.5 | 0.4 | 0.4 | 0.5 |
| FeO | 6.5 | 7.4 | 7.6 | 5.4 |
| $TiO_2$ | 1.6 | 1.6 | 1.6 | 1.4 |
| $Al_2O_3:SiO_2$ | 0.47 | 0.46 | 0.55 | 0.30 |

The high-temperature shrinkage of the fibers was measured. Fibers from each example were tested for their resistance to high temperatures by heating 4 in. by 4 in. by 3 in. (10.16 cm×10.16 cm×7.62 cm) samples at 800 degrees C for 30 minutes. The percent volume shrinkage was then measured for each sample as shown below.

|  | Example A | Example B | Example C | Comparative Example |
|---|---|---|---|---|
| % Shrinkage | 20.1 | 18.3 | 15.2 | 30.4 |

The above results show that the high alumina-content fibers made by the process of the invention exhibit improved high-temperature stability in comparison to a commercial mineral wool formulation containing a lesser amount of alumina.

Although the invention has been described above by reference to preferred and exemplary embodiments, other embodiments and suitable modifications will become apparent to those of ordinary skill in the art. Thus, the invention is intended to be defined not by the foregoing detailed description, but by the appended claims and their equivalents.

What is claimed is:

1. A process for making mineral wool fibers consisting essentially of:

(1) preparing a mixture comprising (a) basalt and (b) a quantity of lumps of uncalcined raw bauxite in which at least 90% of the particles are capable of passing through a 150 mm mesh screen but incapable of passing through a 25 mm mesh screen and are sufficient to provide fibers with an alumina content of at least 18 percent by weight;

(2) heating the mixture to form a melt of said mixture; and (3) forming said melt into said fibers, wherein said fibers have an alumina content of at least 18 percent by weight.

2. A process as defined in claim 1, wherein said mixture further comprises a flux selected from the group consisting of limestone, dolomite, and mixtures thereof.

3. A process as defined in claim 2, wherein said mixture has a weight ratio of said flux to said basalt of less than about 0.6.

4. A process as defined in claim 3, wherein said weight ratio of said flux to said basalt is from about 0.1 to about 0.4.

5. A process as defined in claim 4, wherein said mixture further comprises slag in a weight ratio of said slag to said basalt of less than about 1.0.

6. A process as defined in claim 5, wherein said weight ratio of the slag to the basalt is less than about 0.6.

7. A process as defined in claim 4, wherein said quantity of lumps of uncalcined raw bauxite is sufficient to provide said fibers with an alumina content of from 18 to about 25 percent by weight, and said fibers have an alumina content of from 18 to about 25 percent by weight.

8. A process as defined in claim 7, wherein said quantity of lumps of uncalcined raw bauxite is sufficient to provide said fibers with an alumina content of from about 19 to about 23 percent by weight, and said fibers have an alumina content of from about 19 to about 23 percent by weight.

9. A process as defined in claim 8, wherein said heating of the mixture is conducted in a cupola furnace.

10. A process as defined in claim 9, wherein at least about 90% of the lumps of uncalcined raw bauxite is of a particle size capable of passing through a 150-mm mesh screen but incapable of passing through a 25-mm mesh screen.

11. A process as defined in claim 10, wherein at least about 90% of the lumps of uncalcined raw bauxite is of a particle size capable of passing through a 125-mm mesh screen but incapable of passing through a 50-mm mesh screen.

12. A process as defined in claim 11, wherein said lumps of uncalcined raw bauxite have a bound-water content of from about 10 to about 33 weight percent.

13. A process for making mineral wool fibers consisting essentially of:

(1) preparing a mixture of basalt and lumps of uncalcined raw bauxite ranging in size from 25 mm to 150 mm;

(2) heating the mixture in a cupola furnace to form a melt of said mixture; and (3) forming said melt into fibers.

14. A process as defined in claim 13, wherein said lumps of uncalcined raw bauxite are added to the mixture in a quantity sufficient to provide the fibers with an alumina content of at least 18 percent by weight, and said fibers have an alumina content of at least 18 percent by weight.

15. A process as defined in claim 13, wherein said lumps of uncalcined raw bauxite are added to the mixture in a quantity sufficient to provide the fibers with a weight ratio of alumina to silica greater than 0.35, and said fibers have a weight ratio of alumina to silica greater than 0.35.

16. A process for making mineral wool fibers consisting essentially of:

forming a mixture by mixing (a) a quantity of basalt, (b) a quantity of a flux selected from the group consisting of limestone, dolomite and mixtures thereof to give said mixture a weight ratio of flux to basalt of from about 0.1 to about 0.4, (c) a quantity of slag sufficient to give a weight ratio of slag to basalt of from about 0 to about 0.6, and (d) a quantity of lumps of uncalcined raw bauxite in which at least 90% of the particles are capable of passing through a 150 mm mesh screen but incapable of passing through a 25 mm mesh screen;

combining in a cupola furnace said mixture with coke in a quantity of from about 11 to 25 percent by weight of said mixture;

heating said mixture in said furnace to form a melt of said mixture; and forming said melt into fibers, wherein said fibers have an alumina content of from about 19 to about 23 weight percent.

17. A process as defined in claim 16, wherein at least 90% of the lumps of uncalcined raw bauxite is of a particle size capable of passing through a 125-mm mesh screen but incapable of passing through a 50-mm mesh screen.

18. A process as defined in claim 17, wherein said lumps of uncalcined raw bauxite have a bound-water content of from about 10 to about 33 weight percent.

* * * * *

UNITED STATES PATENT AND TRADEMARK OFFICE
CERTIFICATE OF CORRECTION

PATENT NO. : 6,067,821
DATED : May 30, 2000
INVENTOR(S) : Jackson, et al.

It is certified that error appears in the above-identified patent and that said Letters Patent is hereby corrected as shown below:

On the title page, of lettered patent [73] Assignee should read:

[73] Assignee: Owens Corning Fiberglas Technology, Inc.
Summit, IL and

Owens-Corning Building Products (U.K.) Ltd
St. Helens, England

Signed and Sealed this

Twenty-ninth Day of May, 2001

Attest:

NICHOLAS P. GODICI

*Attesting Officer*  *Acting Director of the United States Patent and Trademark Office*